United States Patent [19]

Rickett

[11] 4,385,518
[45] May 31, 1983

[54] ROAD TEST SIMULATOR

[76] Inventor: Royal C. Rickett, 6228 Fennwood Ct., Sacramento, Calif. 95831

[21] Appl. No.: 249,959

[22] Filed: Apr. 1, 1981

[51] Int. Cl.³ .......................................... G01M 15/00
[52] U.S. Cl. ................................ 73/117; 73/432 SD; 73/862.16
[58] Field of Search ............... 73/117, 862.14, 862.16, 73/432 SD

[56] References Cited

U.S. PATENT DOCUMENTS 3,180,138  4/1965  Hundley ............................... 73/117
3,302,107  1/1967  Flaugher et al. ............. 73/117 UX
4,229,387  10/1980  Rogerson et al. ............. 251/133 X Primary Examiner—Jerry W. Myracle
Attorney, Agent, or Firm—Lothrop & West

[57] ABSTRACT

For simulating a road test of an automotive vehicle having an engine driving a traction wheel through a semi-automatic change-speed transmission, there is provided an anchor for holding the automobile stationary and with the traction wheel in engagement with a roller coupled to a hydraulic pump-motor. There is a hydraulic loop interconnecting the pump-motor and a reservoir and in the loop there is a flow control valve variable to control flow resistance. There is also an accumulator joined to the loop and various valves for controlling and changing the operation of the hydraulic circuitry. Data are taken at various points and displayed and graphed at an accompanying console.

17 Claims, 4 Drawing Figures

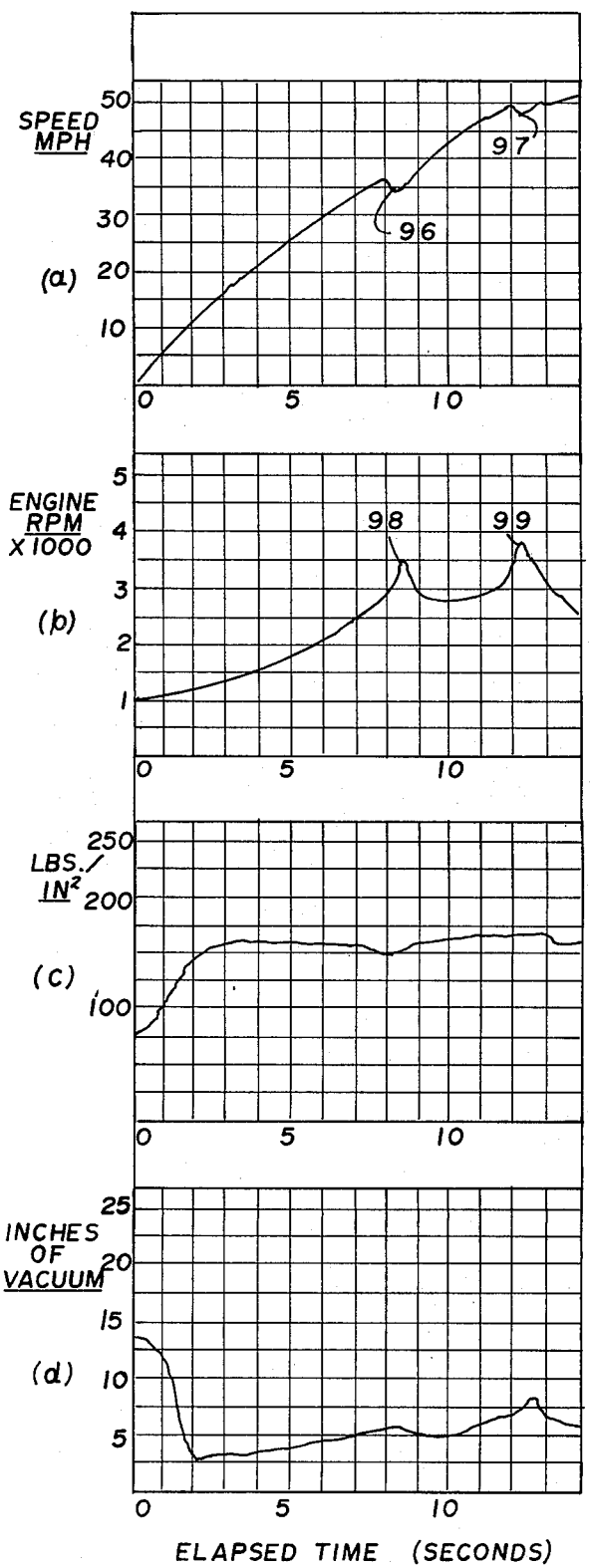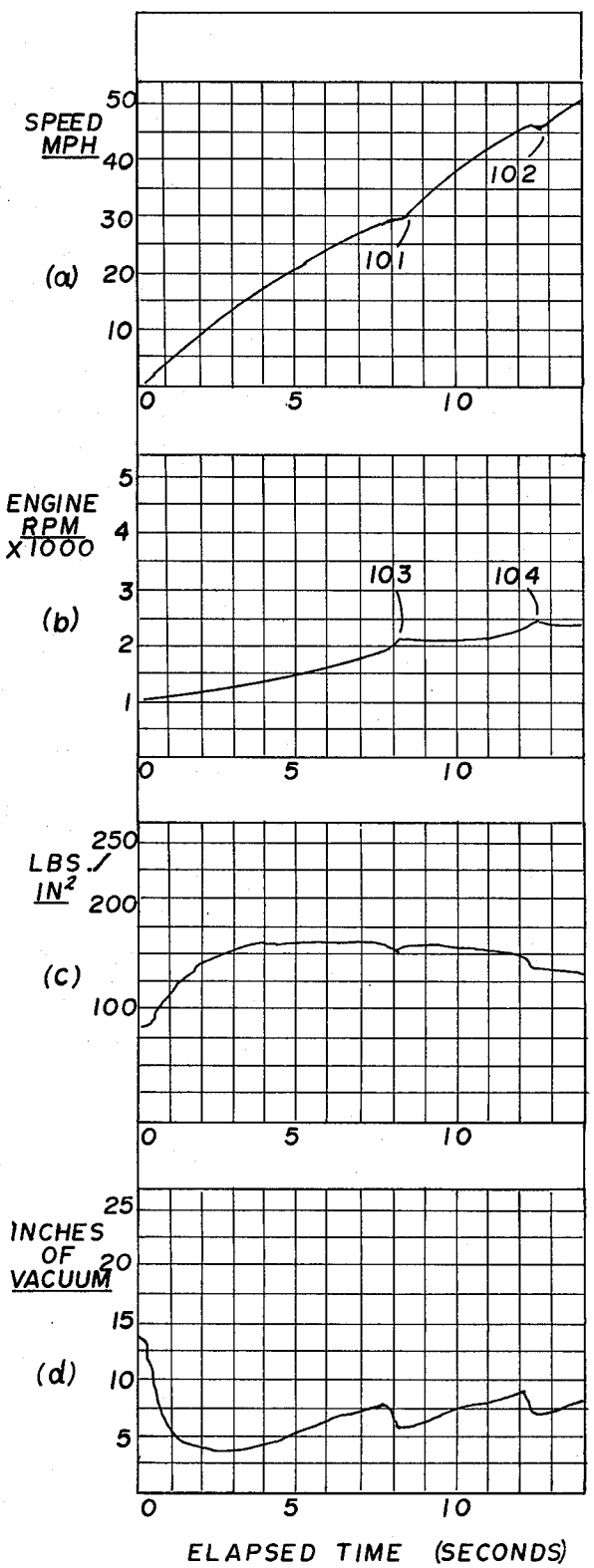

ROAD TEST SIMULATOR

BRIEF SUMMARY OF THE INVENTION

To determine the operating condition and mechanical fitness of vehicular semi-automatic, change gear transmissions, it is customary for a driver and sometimes also an observer to drive the vehicle on a road through various starting, acceleration, speed, pulling, deceleration and braking tests. The car performance is observed largely by feel and sound, and any ills are so diagnosed. This technique of transmission testing often does well where the malfunction is manifest, but there are drawbacks in that more subtle mechanical or hydraulic defects cannot be precisely determined. Seldom does a mechanic interconnect test instruments such as an engine tachometer, a hydraulic oil pressure gauge, or a manifold vacuum gauge to the car prior to an actual road test, yet it is precisely these instruments which must be used to ascertain specific defective components in the transmission. Even if the test instruments were interconnected to the car, a second mechanic must accompany the driver-mechanic to observe the various gauges and meters during the driving test. Lastly, this method does not produce a permanent graphical record of the measured variables in which each variable is time correlated. In short, a graphical record which depicts the relationship between the dynamic variables affecting transmission performance will often reveal much more than separate observations of each variable which are impossible to correlate.

Consequently, I afford herein a stationary test facility with which a road test can be accurately simulated, can be consistently duplicated, does not require more than one observer, and affords a visible, even written, output. While a good deal of variation is possible in the construction and arrangement of a suitable road test simulator, a successful form is described and illustrated herein.

BRIEF DESCRIPTION OF THE SEVERAL VIEWS OF THE DRAWINGS

FIG. 3 is a representation of a typical graph produced by the tester and illustrating transmission slippage at the first to second and second to third gear shift points; and, FIG. 4 is a similar representation, but of a properly functioning transmission.

DETAILED DESCRIPTION OF THE PREFERRED EMBODIMENT

Figure 1:
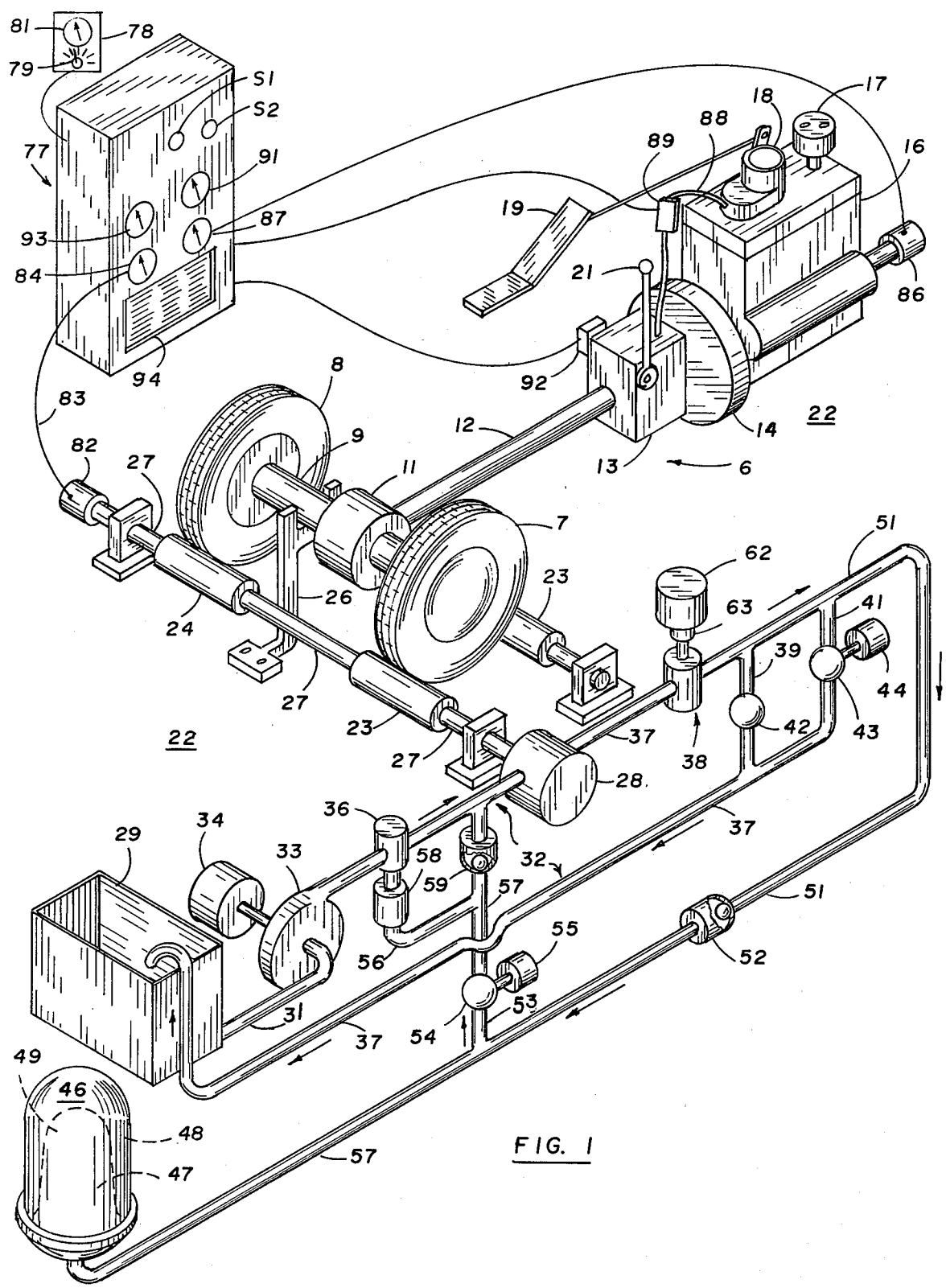
FIG. 1 is a largely schematic or diagrammatic showing, partly in isometric perspective, of a typical road test simulator installation designed to accommodate a standard automobile and capable of affording visual readouts and recorded graphs of the performance of the vehicular transmission under approximated road-driving conditions.

While the road test simulator can be embodied in many ways to deal with a wide variety of vehicles, it is preferably made to check a passenger automobile 6 having a pair of ground-engaging drive wheels 7 and 8, at the ends of an axle 9 provided with a differential gear 11. A drive shaft 12 extends between the differential and a change speed transmission 13, joined through a coupling 14 to a drive engine 16. All of the mentioned parts are internally constituted in recognized ways, or are standard, and are externally supplemented by the usual components and body to provide a complete road vehicle designed to be operated on the road in the customary way.

To this end, the engine 16 includes an ignition distributor 17 and a carburetor 18 or, alternatively, a fuel injector under control of an accelerator pedal 19 positioned alongside the usual brake pedal, not shown. The coupling 14 can be a friction clutch, or a pair of hydraulic rotors, adapted to be uncoupled at low speeds and to couple together at moderate and high speeds. The transmission can vary substantially in arrangement, but typically employs a number of clutches, brakes and planetary gearing units all under the controlled actuation of a hydraulic system. Depending upon the particular vehicle speed, throttle position, engine performance and gear selection by the driver, the transmission establishes and changes the interrelationship between the engine 16 and the wheels 7 and 8.

The transmission 13 usually includes three or four forward speeds, sometimes grouped in different ranges at least partly under driver control, a neutral or uncoupled condition, and a reverse mode. The driver initially moves a control lever 21 from neutral position into reverse or forward position and depresses the pedal 19 to accelerate the engine 16. The added engine speed causes the coupling 14 to engage and to transmit power to the transmission 13 and so to the wheels 7 and 8. The vehicle then moves in reverse direction or, if so set, advances first in the lowest gear and then, as the vehicle speed increases, into the next higher gears, such as second, third and fourth. In some arrangements, the driver can preclude some up-shifts by properly positioning the lever 21. When the pedal is released, the transmission automatically shifts down through the gears in some selected sequence. Finally, the lever 21 is again put in neutral to uncouple the engine from the wheels, the coupling 14 now having maximum slip.

The gear changes in the transmission are in steps, not continuously, and are made by friction clutches and brakes that engage and disengage with various degrees of smoothness and varying coordination. It is to observe and record such changes and coordinations of the transmission machinery that the automobile being checked is driven, onto a shop floor 22, to position the wheels 7 and 8 in engagement with pairs of supporting, friction rollers 23 and 24 projecting slightly above the floor so as to support the wheels in freely rotatable positions (see FIG. 1).

To make sure the vehicle stays in place and in firm engagement with the rollers, an anchor bar 26, fastened to the floor 22, is detachably engaged with the axle 9.

With the engine running and the transmission in gear, the wheels are revolved and the pairs of rollers 23 and 24 correspondingly rotated. At least one of the rollers of each pair is secured on a shaft 27 journalled for free rotation and coupled to a hydraulic displacement device in the form of a pump-motor unit 28. This unit is in a hydraulic loop containing various pipes, components and couplings and is effective in a first mode to produce continuously variable loading upon or resistance to the operation of the transmission 13. In a second mode, the hydraulic loop is actively driven by a source of pressurized hydraulic fluid to provide continuously variable drive to the wheels 7 and 8 and the interlinked drive shaft 12. In a manner to be explained in considerable detail herein, the loading mode of operation simulates an acceleration test and the active drive mode of operation simulates a deceleration test. During these simulated tests, the performance and operation of the transmission can be observed and recorded for later analysis.

With specific reference to the lower portion of FIG. 1, hydraulic fluid, such as oil, is stored in a reservoir 29 at atmospheric pressure and in varying amounts. Flow from the reservoir toward the pump-motor 28 is through a duct 31 included in a loop 32 having several parts but generally affording supply and return flow between the reservoir and pump-motor. The initial portion of the duct 31 goes from the bottom of the reservoir to the inlet of a charging pump 33, driven by an electric motor 34. The discharge of the pump 33 passes through a pilot check valve 36, and a final portion of the duct 31 feeds the inlet of the pump-motor 28.

From the pump-motor 28, a duct 37 has an initial portion going to a flow control valve 38, and a final portion, incorporating parallel branches 39 and 41, returning to the reservoir 29. In the branch 39 is a relief valve 42 normally spring-pressed to a closed position, but set to open and afford pressure relief through the duct 37 to the reservoir 29, should the fluid pressure exceed a predetermined level. In the branch 41 is a normally closed valve 43, selectively opened by the energization of a controlling solenoid 44, allowing flow through the branch 41 and the duct 37 back to the reservoir. In this way, a loop 32 is formed for the recirculation of the oil. Although not shown, it is sometimes advantageous to incorporate an oil cooler or radiator in the duct 37, or at the reservoir, to control the hydraulic fluid temperature.

Under some test conditions, it is helpful to have hydraulic fluid under storage and pressure actively to charge the loop 32 with fluid at an appropriate moment. Consequently, there is provided an accumulator 46, incorporating an oil volume 47 separated from a gas volume 48 by a diaphragm 49. The accumulator and the loop 32 are variously interconnected. One junction is through a conduit 51, extending between the accumulator and the duct 37, downstream of the flow control valve 38. A check valve 52 readily permits fluid flow from the loop 32 into the accumulator, but precludes back fluid flow from the accumulator into the loop 32 via the conduit 51, although there are special means for such back flow through an alternative line.

Between the check valve 52 and the accumulator, a line 53 joins the conduit 51 and passes through a normally closed control valve 54 into a pair of branches 56 and 57. A solenoid 55 determines the operating position of the control valve 54. The branch 56 goes to a cell 58, positively controlling the action of the pilot check valve 36, while the branch 57 goes through a check valve 59 to join the duct 31, just ahead of the pump-motor 28.

To charge the accumulator 46, a suitable supply of hydraulic fluid is put into the reservoir 29, and the electric motor 34 is energized to operate the charging pump 33. Discharge therefrom goes into the duct 31, through the open pilot check valve 36, and to the pump-motor 29, charging and closing the check valve 59 on the way. The engine 16 and transmission 13 are actuated to drive the now-filled pump-motor, thereby passing hydraulic fluid through the duct 37 and into the flow control valve 38. At this time, the valve 38 should be in a substantially open position, determined by the operation of an electric drive motor 62 and an intervening gear reducer 63.

Figure 2:
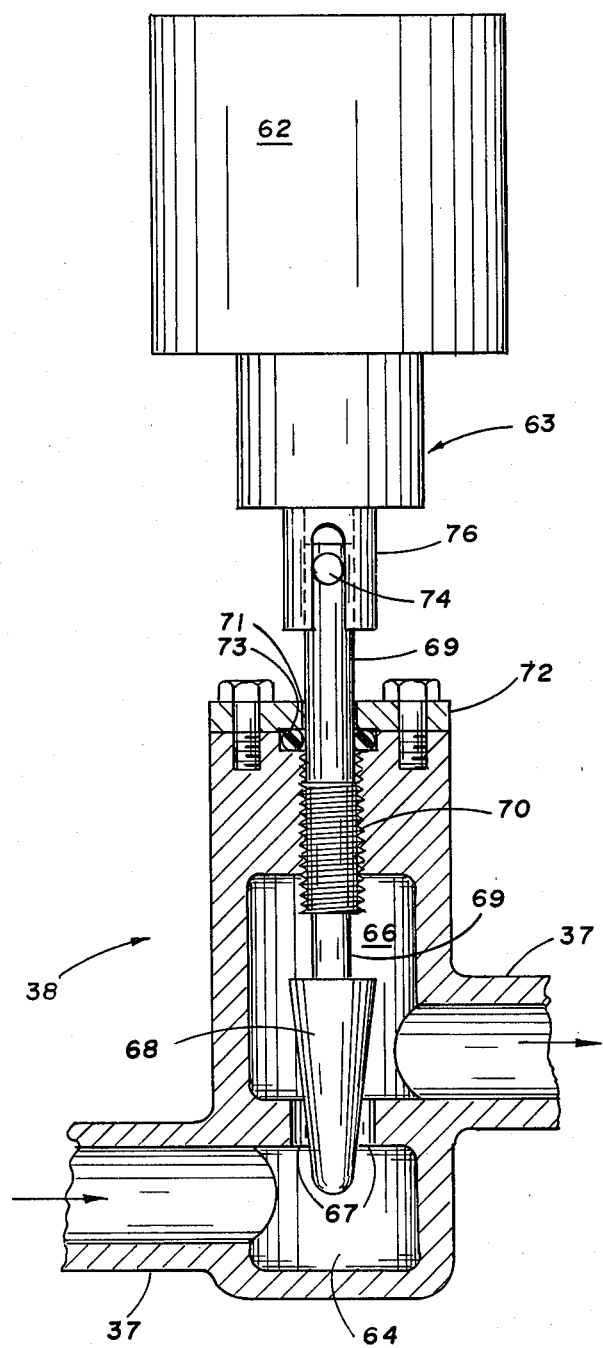
FIG. 2 is a cross-sectional view of a flow control valve used in a hydraulic circuit of the road test simulator.

As shown in detail in FIG. 2, between a valve inlet chamber 64 and a valve outlet chamber 66 is an orifice 67. Flow through the orifice is regulated by a carefully contoured, elongated valve needle 68 of an approximately conical but specially contoured shape having little diametral change for changes in axial length. A conventional valve needle would be more foreshortened than the needle 68, and would include conical walls of approximately 30° to 40° off the longitudinal axis, rather than the gradually tapered conical walls shown in FIG. 2. Consequently, the operation of the needle 68 within the orifice 67 effects a more gradual and linear regulation of the hydraulic flow throughout the range of valve control than would a valve needle of conventional design.

The needle 68 merges with a stem 69, extending first through a threaded portion 70 of the valve body, and then through a bore 71 in the top cap 72. A recessed O-ring 73 is compressed slightly by the cap 72, affording a tight seal against the stem 69. The threaded portion 70 includes unusually fine threads for a valve application on the order of twenty-four threads per inch, to produce a slow rate of translation of the stem 69 for a given rotational movement. Approximately ten complete turns of the stem 69 are required to progress from a fully open to a fully closed position.

A cross bar 74 passes transversely through the outer extremity of the stem 69. A slotted coupler 76 protrudes from the gear reducer 63 to engage the bar 74. When the drive motor 62 is energized forwardly or backwardly, there is a corresponding but relatively small change in the opening or closing of the orifice 67, so hydraulic fluid can pass in greater or lesser amounts and under precise control.

With the flow control valve 38 substantially open, and the normally closed valve 43 in its closed position, charging oil travels into the conduit 51, through the check valve 52 and then into the accumulator 46, deflecting the diaphragm 49 therein. Charging flow also initially passes into the line 53 but is inhibited by the normally closed valve 54, also quickly filled, and the compressed gas volume 48 maintains the fluid under constant pressure. Valve 54 and check valve 52 prevent any back flow from the accumulator 46, and the circuit is thus fully charged and prepared for transmission testing.

Before the acceleration test can begin, switch 51 on the console 77 must be switched on to energize solenoid 44 of the valve 43. This will open valve 43, allowing unimpeded passage of fluid through branch 41 and duct 37 to the reservoir 29, and also ensuring that the accumulator 46 will not become overcharged.

Additionally, the position of the valve 38 must be pre-set at this time to restrict the flow of hydraulic fluid through the duct 37 a predetermined amount. Depending primarily upon the weight and horsepower of the vehicle under test, an appropriate degree of initial loading upon the engine and transmission is imposed by selective adjustment of the flow restriction through the valve 38. A remote box 78 includes a flow control knob 79 and a meter 81 giving a constant readout of the position of the flow control valve. The box 78 is interconnected to the console 77 which, in turn, is interconnected by wires not shown to the motor 62 and to a valve position sensor (not shown). The operator can therefore sit in the driver's seat of the vehicle under test and selectively determine the loading, or rolling resistance, imposed upon the wheels 7 and 8 and the transmission 13.

To test the transmission of the vehicle positioned on the roller pairs 23 and 24, the engine 16 is started and the control lever 21 is put into an appropriate position such as "Drive". Through the differential 11, the wheels 7 and 8 are rotated and so turn the shaft 27. The shaft rotates the pump-motor 28, and the fully charged system causes fluid to travel through the flow control valve 38, against the resistance or restriction imposed thereby. This correspondingly loads the engine 16. By opening or closing the valve 38, through regulation of the motor 62 by manipulating the accelerator pedal 19, and by shifting the lever 21 into its various positions, the operator can impose a wide range of loads on the wheels 7 and 8 and can produce a wide range of torques and speeds at the wheels.

Under the normal acceleration test, the operator will begin with a rather heavy loading factor, to simulate acceleration from a dead stop. As the test continues, the loading must be decreased in a continuous fashion to simulate the decreasing load which the engine and transmission would normally experience as the vehicle picks up speed. The transmission automatically shifts up through its various gears as the loading decreases and the wheel speed increases. The operator, by listening to the operating mechanisms, and by feeling their various vibrations and possible pauses, can often sense either a satisfactory performance or one that is deficient in certain particulars. If needed, repairs can be effected on that basis.

It is preferred, however, to provide specific metered and even recorded test data. For that reason, a console 77 is disposed at a convenient location on the floor 22. One factor supplied is the simulated miles per hour of the vehicle as reflected by the speed of the wheels 7 and 8 and of the shaft 27. A tachometer 82 is coupled to the shaft and through a lead 83 energizes a meter having a display dial 84, one of a number of dials on the console 77 and in full view of the operator while testing. Thus, in addition to whatever reading the usual vehicle speedometer furnishes is the accurate reading of the meter dial 84.

A comparable note is made of the speed of the engine. This can be picked up from the distributor 17, but preferably a tachometer 86 on the engine crankshaft sends a speed signal to a meter dial 87 on the console.

Connected in series with the vacuum line 88, extending between the engine manifold and the control diaphragm (not shown) within the transmission, is a vacuum sensor 89. The output of the sensor 89 is fed to yet another dial 91 on the console 77, giving a constant visual readout of vacuum available at the transmission. Lastly an oil pressure detector 92 is interconnected with the internal oil pump of the transmission, and a dial 94 shows the produced oil pressure at all times.

While the console dials give an accurate and instantaneous indication of the important performance variables of engine speed, wheel speed, engine vacuum, and transmission oil pressure, a chart recorder 94 records four data channels which correspond to the values for each performance variable over the duration of the test. Since the data channels are readily correlated along a vertical, time base axis, the operator has a precise indication of transmission performance under conditions of dynamic test.

With reference to FIGS. 3 and 4, typical graphs of moderate acceleration tests for two transmissions are shown. It is clear that the transmission generally depicted in FIG. 3 is slipping excessively during its first to second and second to third gear shifts, indicated respectively by the numerals 96 and 97 in FIG. 3(a). The slope of the rate of acceleration reverses direction at each upshift point. Further evidence of transmission slippage is evident in FIG. 3(b), showing engine RPM during the test. As indicated by the numerals 98 and 99, a "flareup" or sharp upswing in engine RPM occurred at each shift point. Thus, the transmission under test was unable to hold the torque supplied by the engine during the shifts, and the engine "raced" until the transmission coupler positively engaged.

Transmission oil pressure and diaphragm vacuum, shown in FIGS. 3(c) and 3(d), respectively, indicate normal values for a moderate acceleration test. However, if the oil pressure, for example, indicated an abnormally low value, the slippage would more likely be the result of a problem in the transmission's hydraulic system rather than in one or more of the clutches. An abnormally low value for the vacuum line would likewise present a number of additional diagnosis options which would be obvious to one skilled in the art.

By way of contrast, the performance of a transmission in good condition is illustrated in FIGS. (a)-(d), inclusively. The acceleration curve of FIG. 4(a) shows a barely perceptible moment of leveling off at the 1-2 and 2-3 shift points, indicated by the numerals 101 and 102, respectively. There is no "flare-up" indicated at these same shift points by the numerals 103 and 104 in FIG. 4(b). Rather, a very smooth and gradual increase in RPM occurs as the vehicle increases its simulated speed. Normal oil pressure and vacuum readings are indicated in FIGS. 4(c) and 4(d), respectively.

Of course various types of acceleration tests can be performed and recorded, under hard and moderate acceleration both forwardly and rearwardly. Going up a very steep slope could be simulated by virtually closing the valve 38. However, during a second mode of operation, deceleration or even going down a slope can be simulated as an additional routine of transmission testing.

At the end of an acceleration test, while the vehicle is still traveling a simulated 50 MPH, or so, a deceleration test will check for proper downshifting of the transmission as the vehicle speed gradually decreases. Deceleration is simulated by using energy from the previously charged accumulator 46 to operate the pump motor 28 not as a pump, but as a motor. In other words, the energy stored in the accumulator is analagous to the kinetic energy, or rolling mass of the vehicle, and deceleration is simulated by actively driving the wheels 7 and 8.

Switch S2 on the console 77 is thrown into an on position, energizing the solenoid 55 thereby opening the valve 54 (see FIG. 1). Flow out of the accumulator through part of the conduit 51 is stopped at the check valve 52, but proceeds through the line 53 and through the now open control valve 54. The flow goes through the branch 56 to fill the cell 56, thereby injecting a small portion of fluid into the check valve 36, seating the valve plug in positive fashion. The main portion of the flow goes through the branch 57 and past the check valve 59 to the adjacent portion of the duct 31. Flow toward the reservoir 29 is blocked by the just-closed valve 36, but is made immediately available to the motor 28. The fluid then passes through the flow control valve 38, the branch 41, and the duct 37 before reaching the reservoir 29.

The flow from the accumulator supplies the force to drive the wheels 7 and 8 and the coupled engine 16 all under control of the drive motor 62 and the valve 38. Through manipulation of the knob 79 of the remote box 78, the operator has precise control over the rate of deceleration, as progressively less drive is applied to the wheels 7 and 8, and the transmission is observed for proper downshifting performance.

It will be appreciated that a downhill driving event is likewise simulated, but the amount of drive may be increased, rather than decreased, as the test progresses. Also, the transmission could be manually shifted into first or second gear under such a downhill simulation to observe the compression performance of the transmission-engine combination.

Overall, with this apparatus it is possible without actual road testing to determine the operation of a change speed transmission under various simulated driving circumstances, and also to make precise measurements and graphical records of the transmission's performance.

I claim:

1. A road test simulator for a vehicle with a drive wheel coupled to an engine through a semi-automatic change-speed transmission comprising:
    a. a hydraulic pump-motor;
    b. means for temporarily coupling the drive wheel with said pump-motor;
    c. a reservoir;
    d. means including a hydraulic loop for interconnecting said pump-motor and said reservoir; and,
    e. means in said loop on the outlet side of said pump-motor for imposing a continuously variable resistance to hydraulic flow through said loop to simulate the load imposed upon the transmission by accelerating the vehicle from a stopped condition, said load gradually decreasing from an initial high factor to allow the transmission to shift upwardly through its gears as the drive wheel speed increases.

2. A device as in claim 1 including a pump in said loop at the outlet of said reservoir for charging said loop with hydraulic fluid from said reservoir.

3. A device as in claim 1 in which said means for imposing a continuously variable resistance includes: a valve body having a valve seat; a valve stem; and, means for moving said stem toward and away from said seat.

4. A device as in claim 3 in which said valve stem moving means translates said stem along an axis concentric with said valve seat and in which said stem has a taper proportioned to afford only a relatively small change in valve opening for a relatively large axial movement of said valve stem.

5. A road test simulator for a vehicle with a drive wheel coupled to an engine through a semi-automatic change-speed transmission comprising:
    a. a hydraulic pump-motor;
    b. means for temporarily coupling the drive wheel with said pump motor;
    c. a reservoir;
    d. means including a hydraulic loop for interconnecting said pump-motor and said reservoir;
    e. means in said loop on the outlet side of said pump-motor for imposing a resistance in said loop to simulate the vehicle load under a condition of acceleration, as the drive wheel actuates said pump motor;
    f. a first check valve in said loop between the outlet of said reservoir and the inlet of said pump-motor, said first check valve being normally open toward said inlet;
    g. an accumulator;
    h. a line connecting said accumulator to said inlet of said pump-motor at a location downstream of said first check valve;
    i. a first normally closed control valve in said line for selectively isolating said accumulator from said inlet;
    j. a conduit connecting the outlet of said pump-motor to said accumulator;
    k. a second check valve in said conduit and normally open toward said accumulator to permit the charging of said accumulator; and,
    l. means for opening said first normally closed control valve to permit the discharge of hydraulic fluid from said accumulator into said inlet of said pump-motor to simulate the vehicle load under a condition of deceleration, as said pump-motor actuates the drive wheel.

6. A device as in claim 5 including a solenoid operable to open said first normally closed control valve.

7. A device as in claim 5 including a third check valve in said line between said first normally closed control valve and said inlet, said third check valve normally being open towards said inlet.

8. A device as in claim 5 including a branch in said line originating at a location between said first normally closed control valve and said third check valve and being operatively connected to said first check valve, said first check valve being positively seated in response to high pressure fluid discharged from said accumulator through said line with said first normally closed control valve in open position.

9. A device as in claim 5 including a pressure relief valve in said loop between the outlet of said resistance imposing means and the inlet of said reservoir and operable toward said reservoir in the event fluid pressure exceeds a predetermined amount.

10. A device as in claim 5 including a second normally closed control valve in said loop between the outlet of said resistance imposing means and said reservoir for isolating the input of said reservoir from the portion of said loop downstream of said resistance imposing means in order directly to charge said accumulator.

11. A device as in claim 10 including a solenoid operable to open said second normally closed control valve to permit selective recirculation of fluid in said loop.

12. A device as in claim 5 including means for selectively varying the resistance offered by said resistance imposing means to simulate a varying vehicle load.

13. A device as in claim 12 in which said resistance varying means includes a valve body having a valve seat and includes a valve stem and includes means for moving said stem toward and away from said seat.

14. A device as in claim 13 in which said valve stem moving means translates said stem along an axis concentric with said valve seat and in which said stem has a taper proportioned to afford only a relatively small change in valve opening for a relatively large axial movement of said valve stem.

15. A device as in claim 14 in which said moving means includes a relatively high speed motor and includes a gear reducer between said motor and said valve stem.

16. A device as in claim 1 or 5 including means for denoting the speed of said engine, means for denoting the speed of said wheel, means for denoting the vacuum within a vacuum line between said engine and said transmission, and means for denoting the pressure of hydraulic fluid produced within said transmission.

17. A device as in claim 16 including recorder means for producing a visual record of the simultaneous output of each of said denoting means.

* * * * *